United States Patent [19]

Susa

[11] Patent Number: 4,775,703

[45] Date of Patent: Oct. 4, 1988

[54] PROCESS FOR PREPARING MICROPOROUS POLYVINYLIDENE FLUORIDE MEMBRANES

[75] Inventor: Thomas J. Susa, West Roxbury, Mass.

[73] Assignee: Ionics, Incorporated, Watertown, Mass.

[21] Appl. No.: 158,812

[22] Filed: Feb. 22, 1988

[51] Int. Cl.$^4$ .............................. C08J 9/26; C08J 9/28
[52] U.S. Cl. ........................................ 521/89; 521/61; 521/64; 521/94; 521/95; 521/145
[58] Field of Search ...................... 521/61, 89, 94, 95, 521/145, 64

[56] References Cited

U.S. PATENT DOCUMENTS

| | | |
|---|---|---|
| 3,620,895 | 11/1971 | Bailey .................................... 521/64 |
| 3,642,668 | 2/1972 | Bailey et al. ........................... 521/61 |
| 4,076,656 | 2/1978 | White et al. ........................... 521/88 |
| 4,238,571 | 12/1980 | Mano .................................... 521/64 |

*Primary Examiner*—Morton Foelak
*Attorney, Agent, or Firm*—Norman E. Saliba

[57] ABSTRACT

A process for preparing assymetric polyvinylidene fluoride microporous membranes using novel pore forming agents of an ammonium salt which is a non-solvent for the polymeric casting solution; such agents for example being ammonium hydroxide, ammonium chloride and the like.

2 Claims, No Drawings

PROCESS FOR PREPARING MICROPOROUS POLYVINYLIDENE FLUORIDE MEMBRANES

BACKGROUND OF THE INVENTION

A wide variety of polymers have been used and suggested for use as membrane materials in membrane processes, such as for use in microfiltration, ultrafiltration, reverseosmosis and electrodialysis membrane processes. Polymer membranes are employed for selectively separating molecules, ions and suspended particles from carrier fluids. Polymer membranes have been employed and suggested for ultrafiltration purposes, for separating proteins and other comparatively large molecules from water, such as, for example, the separation of proteins from lactose and mineral salts in whey, which is a by-product of the dairy industry.

In separations involving water-based carriers, it is desirable to employ a membrane which has good mechanical strength and which also exhibits excellent chemical resistance to facilitate cleaning. This application is directed to a process for preparing improved membranes which overcome some of the problems and difficulties of preparing membranes in the prior art, and which improved membranes are useful for solid-liquid or solid-gas separation, especially in corrosive environments.

SUMMARY OF INVENTION

This invention is directed to an improved process for the manufacture of assymetric microporous, polyvinylidenefluoride membranes of controlled pore sizes using a minimal number of hazardous chemical components. The membranes which can be formed into various shapes (such as flat sheets, tubes, hollow fibers, etc.) provide a high permeation rate and a distinct particle size cutoff. These membranes can be readily controlled to possess pore sizes in the range between 1 to 0.1 microns and even down to the ultrafiltration range (i.e. below 0.1 microns).

Previous methods use numerous hazardous chemicals in formulating the membrane casting solution, and such methods are largely influenced by environmental conditions that exists during the formulation and membrane casting process. For example, many of the prior art processes use solvents such as dimethyl formamide, which is a highly toxic and carcinogenic compound. Additionally, the environmental conditions are critical such as the drying step of most prior art processes. At the point in these processess where the polymer solution has been cast onto the desired surface at the desired thickness; this cast film becomes exposed to the atmosphere. In the prior art this drying step is critical in determining the pore size of the membrane, therefore the temperature and the relative humidity of the air in contact with the cast film must be carefully controlled. In U.S. Pat. No. 4,384,047, for example a drying (or evaporation) time of 5 minutes was required where the relative humidity was noted to be at 65%. The relative humidity is critical in the case of polyvinylidene fluoride (PVDF) membrane casting because usually the solvent or nonsolvent used in the prior art has a high affinity for water, and may actually pull water into the cast solution from the atmosphere. Because of the toxicity and/or flammability of many of the solvents used, and their high vapor pressures, precautions must be taken to isolate the air in contact with the cast film. Certain prior art has avoided this problem by casting the film under the surface of the coagulation bath. This however limits the usefulness of the process to essentially continuous membrane lines, because contact with the atmosphere may cause changes in the membrane characteristics. In U.S. Pat. No. 4,203,848, the solvent used is acetone at temperatures above 50° C. Acetone has a high vapor pressure at 25° C. and above 50° C., the vapor pressure approaches one atmosphere. This patent discloses an exposure time in air of less than thirty seconds, and preferably less than ten seconds. Even with such minimal exposure time, the equipment used in the process should be explosion proof, and the contacted air vented to avoid fire and health hazards associated with acetone.

The method of the present invention normally requires the use of only three chemicals in formulating the membrane casting solution and is not substantially influenced by environmental conditions during formulation and casting especially where the preferred solvent N-methyl-2-pyrrolidone (NMP) is used. In the present invention membrane casting solutions comprised of between about 14 to 21 weight percent, (preferably 16 to 19 weight percent) of polyvinylidene fluoride polymer (PVDF), between 79 to 86 weight percent of a solvent, preferably N-methyl-2-dpyrrolidone (NMP), and between 0.05 to 500 parts per million of ammonium chloride, of ammonium hydroxide (or other pore forming agents) is mixed until all the solids are dissolved. The casting solution is degassed using well known standard techniques.

The solution is then cast in the shape required as a thin film (0.5 to 125 mil wet thickness) either on a smooth solid surface, from which it is removed after it solidifies, or on and into a porous support, which becomes an integral part of the finished membrane. After casting the solution, it is coagulated by being immersed in a leaching liquid, or a mixture of liquids and other additives, which do not act as a solvent for the polymer. The finished product is then stored in water. The temperature and formulation of a liquid coagulation bath normally determines the pore size of the final membrane. The preferred coagulation bath is an alcohol (preferably methanol) or an alcohol/water mixture which in some cases contain surfactant. The temperature of the coagulation bath used is normally about 25° C. Generally the higher the temperature of the bath the smaller the pores size, and the lower the temperature the larger the pore size. However, in the present case the temperature is not a critical variable since a 10° C. change in temperature was found necessary to make any significant change in pore size development.

It has been surprisingly found that by adding to the casting solution an ammonium salt which is a non-solvent for the casting solution, such as ammonium hydroxide, pores of adjustable sizes can be formed in the water repellent polyvinylidene polymeric membranes. The present invention is based on this novel and totally unexpected finding. Other pore forming agents that can be utilized in the present invention are those selected from the group consisting of ammonium acetate, ammonium bifluoride, ammonium carbonate, ammonium chloride and ammonium thiocyanate. These non-solvent ammonium salts may be used in the polymer casting solution in the range of between about 0.05 to 500 ppm by weight. (Certain other ammonium salts where found to precipitate in the casting solution and therefore could not be used as the non-solvent pore forming agent in the present invention.) It was further determined that membranes made in accordance with the formulation of the present invention but without the use of the above enumerated pore forming agents would not pass any substantial fluid at pressures up to 75 psi.

In the preparation of the membrane-casting solution for the preparation of improved membranes of this invention, a wide variety of solvents may be employed; however, the choice of solvents is important, since the solvent choice usually affects membrane morphology, as well as membrane performance. With PVDF, most aprotic polar solvents, such as dimethyl acetamide, dimethyl formamide, N-methyl pyrrolidone, dimethyl sulfoxide, diethyl acetamide, triethyl phosphate, hexamethyl phosphoramide, propylene carbonate, tetramethylurea, acetone (above 50° C.) and similar solvents, are acceptable solvent choices for dissolving and forming membrane-casting solutions of PVDF.

In general, solvents are employed which are soluble or miscible in the leaching liquid; for example, water, and which solubilize the PVDF. Volatile organic solvents, such as acetone, may be employed, and the time between casting and leaching may be controlled by the evaporation rate of the solvent to produce membranes of desired properties.

The improved membranes of the invention are prepared in the usual manner of preparing such polymeric membranes, except for the employment of the novel membrane-casting solution. In a method of preparing an improved membrane of this invention with desirable properties, the method comprises preparing a casting solution of a polymer with a solvent for the polymer; and a pore forming agent, coating the casting solution to form a cast film of the membrane typically on permeable support material, such as fabric support material, to form a thin cast film on the support, either in thin, flat film or in tubular form; (generally not allowing any substantial evaporation of the solvent from the cast film) and, thereafter, contacting, such as by immersing, the cast film with a leaching liquid, such as by immersing into a leaching bath typically of water or alcohol, which leaching bath has a liquid miscible with the solvent of the casting solution, and which liquid is not a solvent for the membrane polymer, thereby forming a microporous membrane of the polymer.

The PVDF employed is a thermoplastic polymer, which is available from various sources with various degrees of chain regularly and crystallinity. It has been found that the most preferred PVDF to be employed is a linear polymer of high crystallinity.

It has been found that the range of total solids in the membrane-casting solution useful for membrane formation may vary, but includes from about 14 to 21% by weight, with a preferred range of the polymers in the membrane-casting solution of from about 16 to 19% by weight. Both flux and rejection is affected by the total solids in the membrane-casting solution. The thickness of the cast film used to prepare the improved membrane may vary as desired, but often such cast film is cast upon a porous or permeable material, typically a fabric-type support composed of, for example, polypropylene fibers or nonwoven fibrous material, the thickness of the cast film varying, for example, from 0.5 to 125 mils, but typically about 10 to 25 mils above the permeable support base, while, for high rejection-type membranes, a range of about 16 to 18 mils is often the optimum thickness.

As previously mentioned, the composition and the temperature of the coagulation bath does influence the pore size of the resulting membrane. The leaching liquid employed may vary but any nonsolvent for the PVDF can be used including water, alcohols, glycols, acids, bases and mixtures of the same. The preferred leaching liquid in the present invention is an alcohol (methanol) or a mixture of alcohol and water employed at room temperature. The alcohol/water mixture appears to produce a membrane with a tighter pore size distribution than water alone. The temperature of the bath is not critical since a difference of at least 10° C. appears required to make any substantial difference in the pore size of the resulting membrane.

In the preparation of the improved membranes, the time of evaporation of the solvent (curing); that is, a time period between casting of the membrane film and the leaching of the film, may vary widely without significant effect on the membrane properties. However, for most applications substantially no evaporation time is required, but in the alternate a relatively short curing or evaporating time may be used, typically between 1 and 60 seconds; for example, between 5 and 20 seconds.

As previously stated the prior art methods of membrane manufacture attempt to minimize the curing or air exposure time of the membrane prior to coagulation. During this brief exposure time toxic and flammable fumes of the polymer solvent are released to the atmosphere especially where acetone is the solvent. In the present invention, the preferred solvent is N-methyl-2-pyrrolidone since it has a relatively low vapor pressure, a relatively high flash point, and does not strongly absorb water from the atmosphere. This allows exposing the cast solution to the atmosphere for relatively long periods (on the order of several minutes) without changing the membrane's characteristics or releasing toxic and/or extremely flammable vapors. This is very important from a manufacturing viewpoint.

For the purpose of illustration only, the invention will be described in connection with its preferred embodiment; however, it is recognized that various changes and modifications may be made by those persons skilled in the art, all within the spirit and scope of the invention.

DETAILED DESCRIPTION OF THE INVENTION

The present invention is illustrated in its preferred embodiments by the following examples:

EXAMPLE 1

A casting solution made up of about 16 weight percent PVDF (KYNAR ®)84 weight percent NMP, and 0.05 weight percent ammonium chloride, is cast on a glass plate with a doctors knife set to form a film 0.024 inches (24 mil) thick, and is thereafter immediately immersed in a coagulation bath of 100% isopropyl alcohol. The resulting membrane has an average pore size of 0.9 microns (as indicated by bubble point testing with methanol), and when tested using a solution containing 10,000 ppm (1%) copper hydroxide, has a permeate flux of 550 gallons per square foot per day (GFD) at an inlet pressure of 40 psi. The permeate contained less than 0.1 ppm of copper, a separation of greater than 99.99%.

The flow rate (flux) of the resulting membrane is determined using a stirred microfiltration pressure cell in the following manner. A circular membrane piece is placed in the cell and the cell closed. A suspension of copper hydroxide containing 1000 ppm of copper is added and the cell pressured to the desired level. The volume of liquid (permeate) passing through the membrane in a known time interval is used to calculate the permeate flux rate. A small sample of the permeate is analyzed using atomic absorption spectroscopy to determine the amount of copper passed through the membrane.

EXAMPLE 2

A membrane is made as in Example 1, with the exception that the immersion bath consists of a one to one mixture of isopropyl alcohol and water. The resulting membrane has an average pore size of 0.45 microns and when tested under the same conditions as Example 1, has a permeate analysis of less than 0.1 ppm copper (99.99% retention) and a flux of 25.5 GFD.

EXAMPLE 3

A casting solution made as in Example 1 is coated on the inside wall of a porous polypropylene tube, and thereafter immersed in a methanol bath. The resulting membrane filter has an average pore size of 0.6 microns and when tested as in Example 1 has a permeate analysis of 0.16 ppm copper and a flux of over 650 GFD at an inlet pressure of 45 psi.

EXAMPLE 4

Composition of casting solution:
18.0 weight % of polyvinylidene fluoride (PVDF).
82.0 weight % of N-Methyl-2-pyrrolidone.
0.5 ppm of ammonium hydroxide.

The solution is cast as a film 24 mil thick on a glass plate and after 20 seconds immersed in a methanol bath. The resulting membrane has an average pore size of 0.6 microns and when tested had a permeate analysis of less than 0.1 ppm of copper, with a flux rate of 890 GFD at an inlet pressure of 40 psi.

EXAMPLE 5

A membrane is made as in Example 4 with the exception that the immersion bath is an equal mixture of methanol and water. The resulting membrane had much smaller pores (average pore size is 0.15 microns) with a permeate flux rate of 15.8 GFD at 40 psi.

EXAMPLE 6

Various membranes were fabricated in the above described manner using the pore forming agents of ammonium acetate, ammonium bifluoride, ammonium carbonate and ammonium thiocyanate. In all cases the resulting membranes when flux tested produced a separation factor of at least 99%.

I claim:

1. A casting solution adapted to be partially evaporated to form a film for subsequent conversion into a microporous membrane by leaching, said casting solution comprising about 14-21 wt. % of vinylidene fluoride polymer, 79-86 wt. % of a polar solvent capable of dissolving said polymer and between about 0.05-500 parts per million of a pore forming agent selected from the group consisting of ammonium hydroxide, ammonium acetate, ammonium bifluoride, ammonium carbonate, ammonium chloride and ammonium thiocyanate.

2. The casting solution of claim 1 wherein the solvent is selected from the group consisting of dimethyl acetamide, dimethyl formamide, N-methyl-2-pyrrolidone, dimethyl sulfoxide, diethyl acetamide, triethyl phosphate, hexamethly phosphoramide, propylene carbonate, tetramethylurea and acetone.

* * * * *